(12) United States Patent
Andresen et al.

(10) Patent No.: US 9,000,734 B2
(45) Date of Patent: Apr. 7, 2015

(54) METHOD AND ARRANGEMENT FOR OPERATING A WIND TURBINE CONVERTER

(71) Applicants: Björn Andresen, Ostbirk (DK); Bo Yin, Brande (DK)

(72) Inventors: Björn Andresen, Ostbirk (DK); Bo Yin, Brande (DK)

(73) Assignee: Siemens Aktiengesellschaft, München (DE)

( * ) Notice: Subject to any disclaimer, the term of this patent is extended or adjusted under 35 U.S.C. 154(b) by 174 days.

(21) Appl. No.: 13/741,470

(22) Filed: Jan. 15, 2013

(65) Prior Publication Data

US 2013/0193933 A1 Aug. 1, 2013

(30) Foreign Application Priority Data

Jan. 26, 2012 (EP) .................................... 12152682

(51) Int. Cl.
*H02P 9/02* (2006.01)
*H02M 5/458* (2006.01)
*H02J 3/38* (2006.01)

(52) U.S. Cl.
CPC ............. *H02P 9/02* (2013.01); *H02M 5/458* (2013.01); *H02J 3/386* (2013.01); *Y02E 10/763* (2013.01)

(58) Field of Classification Search
CPC ........................... H02P 9/305; H02P 2009/004
USPC .......................................................... 322/23
See application file for complete search history.

(56) References Cited

U.S. PATENT DOCUMENTS

| | | | | |
|---|---|---|---|---|
| 5,225,712 A * | 7/1993 | Erdman | | 290/44 |
| 7,126,236 B2 * | 10/2006 | Harbourt et al. | | 290/44 |
| 7,423,412 B2 * | 9/2008 | Weng et al. | | 322/20 |
| 2007/0177314 A1 * | 8/2007 | Weng et al. | | 361/20 |
| 2011/0031762 A1 * | 2/2011 | Letas | | 290/55 |
| 2011/0057444 A1 * | 3/2011 | Dai et al. | | 290/44 |
| 2011/0141637 A1 * | 6/2011 | Klodowski | | 361/56 |
| 2012/0104754 A1 * | 5/2012 | Rudolf et al. | | 290/44 |
| 2012/0133343 A1 * | 5/2012 | Grbovic | | 322/21 |
| 2013/0077367 A1 * | 3/2013 | Zhu et al. | | 363/97 |
| 2014/0001759 A1 * | 1/2014 | Gupta et al. | | 290/44 |

FOREIGN PATENT DOCUMENTS

| | | |
|---|---|---|
| AU | 2009342166 A1 | 11/2010 |
| EP | 2135349 B1 | 11/2010 |

OTHER PUBLICATIONS

Feltes et al., High voltage ride-through of DFIG-based wind turbines, IEEE, Jul. 24, 2008.*

* cited by examiner

*Primary Examiner* — Pedro J Cuevas
*Assistant Examiner* — Sean Gugger

(57) ABSTRACT

A method of operating a converter of a wind turbine for providing electric energy to a utility grid includes determining a grid voltage. If the grid voltage is between a nominal voltage and a first voltage threshold, i.e. higher than the nominal voltage, a normal procedure for lowering the grid voltage is performed. If the grid voltage is above the first voltage threshold, another procedure for keeping the wind turbine connected is performed, wherein the other procedure is different from the normal procedure. Further a corresponding arrangement is described.

14 Claims, 3 Drawing Sheets

METHOD AND ARRANGEMENT FOR OPERATING A WIND TURBINE CONVERTER

CROSS REFERENCE TO RELATED APPLICATIONS

This application claims priority of European Patent Application No. 12152682.6 EP filed Jan. 26, 2012. All of the applications are incorporated by reference herein in their entirety.

FIELD OF INVENTION

A method and an arrangement for operating a converter of a wind turbine for providing electric energy to a utility grid are provided, wherein the method involves responding to an overvoltage in the utility grid.

ART BACKGROUND

During the operation of a utility grid providing electric energy to a number of consumers there may be grid fault or grid disturbance, including capacitor switching on-off events etc. which may lead to an overvoltage in the utility grid, i.e. to a voltage of the utility grid which is above a nominal voltage of the utility grid.

The overvoltage or switching transients may be in the range of 140% to 150% of the nominal voltage and may have a duration between 1 ms and 20 ms. The overvoltage of the utility grid in particular together with a high voltage induced by a switching action and/or a switching transient of transistor modules may result in extremely high voltages at some of the energy production facilities, such as a wind turbine. The transient overvoltage may destroy components of the energy producing facility, in particular the wind turbine, wherein the components may include filters, such as a pulse width modulation (PWM) filter, a converter and also auxiliary equipment, such as a UPS, etc.

The grid voltage may be determined based on measurements for example at the point of common coupling, where a plurality of wind turbines is connected to the utility grid. The overvoltage may for example occur several times per day, for example due to switching events on the transmission system connecting the point of common coupling to the utility grid or a number of consumers.

Conventionally, a number of wind turbines, such as a fraction of ⅔ may be disconnected from the utility grid due to the overvoltage in the utility grid. Thereby, these disconnected wind turbines can not anymore provide electric energy to the utility grid, thus reducing the efficiency of the wind turbine power plant. Switching off the wind turbines in a conventional system may also referred to as tripping the wind turbines.

EP 2 135 349 B1 describes a method for operating a wind energy system in case of overvoltage in the grid, wherein reactive power generated by the wind turbine is supplied to the utility grid, to lower the grid voltage.

However, it has been observed that conventional methods and arrangements for responding to an overvoltage in the utility grid are not satisfactory in all situations and in particular do not reduce the overvoltage in a reliable manner.

SUMMARY OF THE INVENTION

There may be a need for a method and an arrangement for operating a converter of a wind turbine for providing electric energy to a utility grid, wherein an overvoltage in the utility grid may be appropriately responded to, in order to lower the grid voltage and to protect components of the wind turbine from potential damage due to the overvoltage.

This need may be met by the subject matter of the independent claims. The dependent claims specify particular embodiments.

According to an embodiment, a method for operating a converter of a wind turbine for providing electric energy to a utility grid is provided, the method comprising determining a grid voltage; if the grid voltage is between a nominal voltage and a first voltage threshold higher than the nominal voltage, performing a normal procedure for lowering the grid voltage; if the grid voltage is above the first voltage threshold, performing another procedure to keep a DC voltage of the converter in an acceptable range (in order to allow to keep the wind turbine connected to the grid), the other procedure being different from the normal procedure.

If the grid voltage is above the first voltage threshold, performing the other procedure to keep a DC voltage of the converter in an acceptable range may be necessary in order to protect the wind turbine (still connected to the grid) from damage.

The converter may be a AC-DC-AC converter for converting a variable frequency power stream (voltage and/or current) generated by a electric generator of the wind turbine to a DC energy stream (voltage and/or current) and from the DC energy stream (having the DC voltage of the converter) to a fixed frequency (such as having a frequency of 50 Hz or 60 Hz) energy stream (voltage and/or current) which may be provided at an output terminal (for each phase, such as for three phases) of the converter.

The converter may be a full scale converter, where the wind turbine is a full scale converter type wind turbine. Alternatively the wind turbine may be a doubly fed induction generator (DFIG) type wind turbine having the appropriate converter.

The acceptable range of the DC voltage of the converter may be between 130% and 70%, in particular 110% and 90%, of a nominal DC voltage. The acceptable range of the DC voltage of the converter may substantially be the nominal DC voltage.

The output terminal of the converter may be connected, in particular via a wind turbine transformer, a wind turbine reactor or inductor and a wind turbine transmission line to a point of common coupling to which a plurality of wind turbines are connectable or are connected. The point of common coupling may be connected, in particular via a wind farm transformer and a large distance transmission line, to the utility grid for providing the electric energy to a plurality of consumers.

The wind turbine may comprise a wind turbine tower, a nacelle mounted on top of the wind turbine tower, the nacelle having a rotation shaft rotatably supported within the nacelle, wherein plural rotor blades are connected at the rotation shaft at one end. Further, the rotation shaft may be mechanically connected to a generator which generates electric energy upon rotation of the rotation shaft.

Thereby, the converter may comprise a generator side converter portion, which receives the variable frequency power stream from the wind turbine generator and converts it to a direct current (DC) energy stream. Thereby, the generator side converter portion may comprise at least one (in particular three pairs of) controllable switch, such as an insulated-gate bipolar transistor (IGBT) which may be connected between two DC nodes.

The converter may further comprise a DC link comprising a capacitor and a chopper circuit. The DC link of the converter may be connected to a grid side portion of the converter, wherein the grid side portion of the converter may comprise at least one (in particular two controllable switches per phase) controllable switch, such as an IGBT which may be provided with appropriate control signals, such as pulse width modulation signals, for converting the DC power stream to a AC power stream (voltage and/or current) having a predetermined frequency, such as 50 Hz or 60 Hz.

Determining the grid voltage may comprise measuring a voltage at a location anywhere between the output terminal of the converter and the utility grid. In particular, the grid voltage may be measured at a point of common coupling or at any location between the point of common coupling and the output terminal of the converter. Determining the grid voltage may also comprise additionally or alternatively estimating the grid voltage from one or more measurements of voltages at one or more different locations. Measuring the grid voltage may be performed by a measurement system which may be controlled or may be accessible by a wind farm controller or wind farm pilot. Measurement data may be transmitted from the wind farm controller to the individual wind turbines.

The nominal voltage may be a normal operation voltage of the utility grid as defined by local requirements.

In particular, the wind turbine may operate in a normal operation mode for providing electric energy to the utility grid in situations, where the grid voltage deviates not more than 15% from the nominal grid voltage.

The first voltage threshold may be between 115% and 130% of the nominal voltage.

By performing the other procedure, when the grid voltage is above the first voltage threshold, more appropriate measures may be carried out, when the grid voltage has particular high values. In particular, if the grid voltage is above the first voltage threshold the measures or method steps comprised in the normal procedure may not be sufficient to effectively lower the grid voltage. In contrast, the other procedure may effectively lower the grid voltage or at least keep the DC link voltage at allowed range, if the grid voltage is above the first voltage threshold. Thereby, components of the wind turbine, such as a filter, the converter, the reactor, etc. may be protected from damage.

According to an embodiment, the other procedure comprises enabling a chopper, wherein enabling the chopper comprises switching a first controllable switch to a conducting state, in particular with a fixed PWM frequency of 2.5 kHz, or with hysteresis control and/or bang-bang control, for dissipating electric energy, wherein the first controllable switch is connected between two DC nodes of a DC-link of the converter.

In contrast, if the chopper is disabled, the first controllable switch may be switched to a non-conducting state, and may not adopt a conducting state.

In particular, in a state of an enabled chopper the first controllable switch may be switched using pulse width modulation pulses having longer (average) on-time (corresponding to the conducting state) than in the state of a disabled chopper.

The chopper may be a circuit comprised in the DC-link of the converter. The first controllable switch (or a plurality of first controllable switches) may comprise a transistor, such as an IGBT. During normal operation the chopper may be disabled which may comprise to switch the first controllable switch to a non-conducting state. In the case in which the grid voltage is above the first voltage threshold switching the first controllable switch to the conducting state may connect electrically the two DC nodes such as to allow current flow from one of the two DC nodes to the other of the two DC nodes (in particular through a resistor), in order to maintain the DC link voltage in the acceptable range (in particular constant at the nominal DC voltage) by energy dissipation, for example.

In particular, if the grid voltage is above the first voltage threshold, by injecting reactive power to the utility grid the grid voltage may not be effectively reduced and turbine might not be able to deliver power to grid due to high grid voltage. Thus, the DC link voltage might increase due to charging the DC capacitor. As a result, turbine might be tripped due to high grid voltage as well as PWM transient or high DC link voltage. Thus, in this case it may be more effective to (alternatively or additionally), in particular using the chopper, to maintain DC link voltage at the acceptable range, thereby protecting the wind turbine and enable to keep the wind turbine connected to the grid.

According to an embodiment, between the two DC nodes a resistor and the first controllable switch are connected in series.

In the situation, when the grid voltage is above the first voltage threshold, current may flow from one of the two DC nodes via the resistor and the conducting first controllable switch to the other of the two DC nodes to dissipate energy. In particular, in parallel to the resistor a diode may be connected and in parallel to the first controllable switch another diode may be connected. Thereby, the two diodes may be connected in serial in a same orientation. In particular, an anode of the diode may be connected to a DC node which carries a negative potential during normal operation. In particular, the cathode of the diode may be connected to the DC node which has a positive potential during normal operation.

According to an embodiment, the other procedure comprises, in particular after enabling the chopper, disabling pulse width modulation, wherein disabling pulse width modulation comprises switching a second controllable switch of a grid side converter portion to a non-conducting state, dissipating electric energy by current flow through a diode, wherein the second controllable switch and the diode are connected in parallel between the two DC-nodes, wherein the second controllable switch is provided with pulse width modulation signals for controlling the conductance state of the second controllable switch to change with a higher frequency than the grid frequency, if the grid voltage deviates from the nominal voltage by less than 15% (corresponding to a normal operation mode).

In particular, the resistor may limit the magnitude of the current flowing from one of the two DC nodes to the other of the two DC nodes. Thereby, components such as a cable and capacitor may be protected from damage.

The second controllable switch may be a transistor, such as an IGBT. In particular, the grid side converter portion may comprise at least two second controllable switches per phase (e.g. three phases in total), wherein the converter may in particular support three electric phases. In particular, per phase, two second controllable switches may be connected between the two DC nodes. In between the two second controllable switches (per phase) an output terminal of the converter (for this particular phase) may be connected.

Further, to the output terminal (of each phase) a reactor or inductor (e.g. a wire wound around metal core) may be connected for filtering the output power stream, such as to remove or at least attenuate high frequency components of the energy stream. Further, in particular beyond the reactor or inductor, a pulse width modulation filter may be connected, in order to generate from the output stream an at least approximately sine or cosine shaped output energy stream having the predetermined grid frequency. Thereby, the grid period may be the inverse of the grid frequency.

In particular, the second controllable switch may be switched to the non-conducting state during a time interval in which the grid voltage is above the first voltage threshold, thus during the entire overvoltage situation or condition.

The diode of the grid side converter portion may be connected in parallel to the second controllable switch. In particular, every second controllable switch comprised in the grid side converter portion may have a corresponding diode connected in parallel thereto. By dissipating the energy by current flow through the diode and resistor on the DC chopper the DC link voltage may effectively be maintained in the acceptable range, in particular constant at the nominal DC voltage.

During a normal operation of the wind turbine the (in particular two) second controllable switch is controlled by control signals which comprise pulse width modulation signals. Thereby, the pulse width modulation signals may comprise pulses having a pulse frequency (being e.g. between 50 times and 100 times the grid frequency), wherein each pulse defines a particular on-time and a particular off-time corresponding to a conducting state and a non-conducting state, respectively, of the controlled second controllable switch. In particular, by varying the widths of the plural pulses comprised in the pulse width modulation signal, it may be possible to output at the output terminal of the converter a power stream having the predetermined grid frequency after filtering out high frequency components.

The normal operation mode may be adopted, if the grid voltage deviates less than 15% from the nominal voltage.

Disabling pulse width modulation may result in ceasing energy transfer from the wind turbine to the utility grid.

In particular, during the other procedure the wind turbine may stay connected to the utility grid. Thus, the wind turbine need not be disconnected from the utility grid during carrying out the other procedure, at least not in all situations during carrying out the other procedure. Thereby, the method may be simplified.

According to an embodiment, the other procedure comprises performing a first procedure, if the grid voltage is above the first voltage threshold (V1) and below a second voltage threshold; and performing a second procedure, if the grid voltage is above the second voltage threshold.

Performing or carrying out the first procedure or the second procedure in dependence of the magnitude of the grid voltage may allow to perform method steps which are specific for (or adapted to) the actual grid voltage and may thus be adapted to be effective for reducing the DC voltage and allow to keep the wind turbine connected to the grid.

In particular, the second procedure may branch to the normal procedure under certain conditions or may branch to the first procedure under certain conditions resembling the conditions for branching into the first procedure.

Thereby, the method may effectively be implemented in a simple manner comprising for example a number of software modules which may be invoked or carried out from different situations or locations within the method.

According to an embodiment, the first procedure comprises, if the grid voltage is above the first voltage threshold and below the second voltage threshold for at least a first time interval, pitching out rotor blades, wherein pitching out rotor blades comprises adjusting a pitch angle of at least one rotor blade of the wind turbine such as to reduce energy absorbed or captured from wind resource.

The first time interval may be between 0.1 s and 0.2 s, in particular about 0.15 s, for example. If the grid voltage is above the first voltage threshold for at least the first time interval even after enabling the chopper and disabling the pulse width modulation it may indicate that these previous measures are not sufficient to effectively avoid turbine tripping off the grid. Thereby, it may be appropriate to start pitching out the rotor blades of the wind turbine, in order to reduce energy to be dissipated in the chopper.

Thereby, the orientation of the rotor blade (regarding its rotational position related to a rotation of the rotor blade along a longitudinal axis of the rotor blade) may be characterized by the pitch angle. Depending on the pitch angle the amount of wind energy captured by the blade may be altered. In particular, by pitching out the blade, less energy will be captured from wind resource and converted into electrical energy. Thus, less energy needs to be dissipated in the chopper at the DC link. This might avoid over heating of DC chopper.

According to an embodiment, the first procedure comprises, after pitching out rotor blades, if the grid voltage is above the first voltage threshold for at least another first time interval, tripping the wind turbine, wherein tripping the wind turbine comprises disconnecting the wind turbine, in particular the converter, from the utility grid.

The other first time interval may be greater than the first time interval. Even after pitching out the rotor blades which may have been performed after the first time interval has elapsed during which the grid voltage is above the first voltage threshold, the grid voltage may nevertheless stay above the first voltage threshold. Thereby, it may be indicated, that the DC chopper is no longer able to handle energy from generator converter and grid converter due to thermal capability or overheating problems, if the grid voltage has not recovered to below the first voltage threshold after the other first time interval.

Thus, as a last measure to protect components of the wind turbine from damage, the wind turbine may be tripped, thereby disconnecting the wind turbine from the utility grid. However, disconnecting the wind turbine from the utility grid may only be carried out when all previous measures, i.e. enabling the chopper, disabling the pulse width modulation involving disconnecting energy by current flow through the diode, and pitching out the rotor blade turn out to be not sufficient to effectively protect the wind turbine from damage.

Thus, disconnecting the wind turbine from the utility grid may only carried out in a small fraction of situations or for a small number of wind turbines in a power plant, even during overvoltage events in the utility grid.

Thereby, energy supply of the wind turbine may not be reduced excessively but only to the required extent.

According to an embodiment, the first procedure comprises, if after disabling pulse width modulation the grid voltage deviates less than 15% from the nominal voltage, enabling pulse width modulation, wherein enabling pulse width modulation comprises providing the second controllable switch (in particular three pairs of controllable switches) with pulse width modulation signals for controlling the conductance state of the second controllable switch such as to achieve the nominal voltage at an output terminal of the converter.

Thus, if the grid voltage falls below the first voltage threshold pulse width modulation may be enabled in order to start resuming a normal operation. Thereby, energy supply of the wind turbine may be re-established without delaying the energy supply excessively. Thereby, the efficiency of the wind park may be improved.

According to an embodiment, the first procedure comprises after enabling pulse width modulation, disabling the chopper wherein disabling the chopper comprises switching the first controllable switch to a non-conducting state for disconnecting the two DC-nodes from each other.

By disabling the chopper the DC voltage generated by energy supply from the wind turbine generator may not be dissipated by energy flow through the chopper resistor. Thereby, this energy is available to be converted by the grid side converter portion to the fixed frequency energy stream. Thus, low energy produced by the wind turbine is wasted but it is supplied to the utility grid.

According to an embodiment, the second procedure comprises, if the grid voltage is above the second voltage threshold for at least a second time interval, pitching out rotor blades.

Thus, even after enabling the chopper and disabling the pulse width modulation the grid voltage is above the second voltage threshold for at least the second time interval, wherein the second time interval may for example be between 0.01 s and 0.02 s, in particular about 0.015 s, for example. In particular, the second time interval may be between 0.005 s and 0.02 s. By pitching out the rotor blade reduction (or maintaining in the acceptable range) of the DC voltage may more effectively be achieved while performing enabling the chopper and disabling the pulse width modulation involving dissipating electric energy by current flow through the diode of the grid side converter portion.

According to an embodiment, the second procedure comprises, if the grid voltage is above the second voltage threshold for at least another second time interval, tripping the turbine, wherein the other second time interval is greater than the second time interval by delta.

In particular, the second time interval may be between 0.01 s and 0.03 s, in particular about 0.02 s, for example. Thus, even after pitching out the rotor blades the grid voltage stays above the second voltage threshold for a total time of at least the second time interval. Thus, the previous measures to reduce the DC voltage, i.e. enabling the chopper, dissipating electric energy by current flow through a diode of the grid side converter portion and pitching out the rotor blades still does not result in reducing the DC voltage to be in the acceptable range. Instead, the grid voltage stays above the second voltage threshold for a total time of at least the other second time interval. Thus, as a last measure to protect components of the wind turbine from damage due to the high grid voltage, the wind turbine is disconnected from the utility grid.

According to an embodiment, the second procedure comprises, if the grid voltage is above the first voltage threshold and below the second voltage threshold, performing the first procedure.

Thus, in a particular situation of performing the second procedure it is branched to performing the first procedure. Thereby, the control method of operating method may be simplified. In particular, if the method is implemented in software, some software modules may be reduced, in particular software modules implementing the first procedure.

According to an embodiment, the first procedure and/or the second procedure comprises, if the grid voltage is above the nominal voltage and below the first voltage threshold, performing the normal procedure.

Thus, also during performing the first procedure and/or the second procedure under certain circumstances the normal procedures may be performed. Thereby, the method may even be simplified. In particular, when the method is implemented in software or at least partly implemented in software, a software module implementing the normal procedure may be reduced.

According to an embodiment, the normal procedure comprises injecting reactive power from the wind turbine to the utility grid.

In particular, injecting reactive power from the wind turbine to the utility grid may involve or comprise keeping the wind turbine connected to the utility grid, disabling the chopper and controlling the conductance state of the second controllable switch (or plurality of controllable switches) such as to provide a particular power stream having a particular phase (relative to a phase of the grid voltage) in order to reduce the grid voltage. Thereby, injecting the reactive power from the wind turbine to the utility grid may only be effective, when the grid voltage deviates less than for example 15% from the nominal grid voltage.

It should be understood that features individually or in any combination disclosed, described, mentioned or employed for a method for operating a converter of a wind turbine may also be applied, used for or provided (individually or in any combination) to an arrangement for operating a converter of a wind turbine according to an embodiment and vice versa.

According to an embodiment, it is provided a wind turbine comprising an arrangement as described above. The arrangement may in particular be comprised or form a part of a wind turbine controller. The signal indicative for the grid voltage may be received from a measurement system or from a wind park controller. The processor may comprise a semiconductor material having a circuit integrated therein. In particular, software instructions may be executing within the processor, wherein the software instructions are adapted to carry out a method according to an embodiment.

Embodiments are now described with reference to the accompanying drawings.

DETAILED DESCRIPTION OF EMBODIMENTS

In a conventional method for responding to overvoltage of the utility grid the components of the wind turbine have either to be over-dimensioned or the wind turbine has to be disconnected (tripped) to protect the components, as they would be destroyed when they would operate at these overvoltage. However, tripping a wind turbine from a transient overvoltage may cause turbine islanding and that in turn induces high voltage in the wind turbine generator and wind turbine converter. In worst scenarios, according to conventional methods and systems, this may damage some auxiliary equipment such as UPS. In addition, the disconnected wind turbine cannot deliver or supply electric energy to the utility grid, until it restarts and connects to the utility grid again.

Embodiments are directed to improve operation methods of operating a wind turbine, in particular of operating a converter of the wind turbine, in order to cope with the above-mentioned problems.

Figure 1:
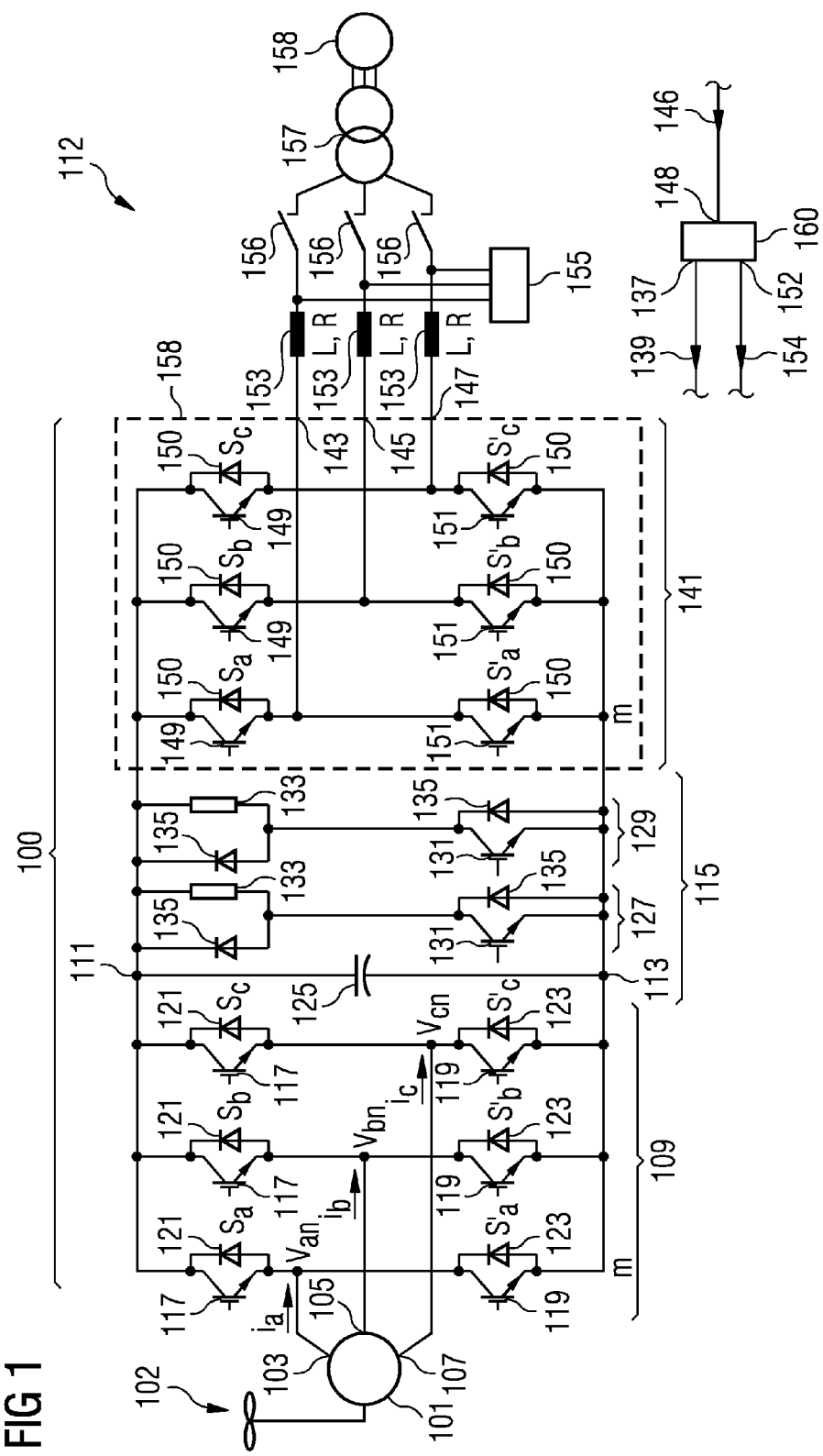
FIG. 1 schematically illustrates a AC-DC-AC converter of a wind turbine which may be controlled according to embodiments.

FIG. 1 schematically illustrates a portion 112 of a wind power plant including (as part of a wind turbine) a AC-DC-AC converter 100 which may be operated or controlled using a method according to an embodiment or using an arrangement 160 for operating a converter according to an embodiment.

In FIG. 1, a full scale converter 100 is presented. According to other embodiments the converter may be adapted for a converting a power stream delivered from a doubly fed induction generator (DFIG).

A wind turbine generator 101 generates, upon rotation of a rotation shaft 102 to which plural rotor blades are connected, an electric energy stream which is supplied using three phases at output terminals 103, 105 and 107 of the generator 101. The three phases 103, 105, 107 of the electric energy stream are supplied to a generator side converter portion 109 which converts the variable frequency AC power stream delivered from the generator 101 to a direct current energy stream involving generation of a DC voltage VDC between a first DC node 111 and a second DC node 113 of a DC-link 115. In particular, during normal operation the first DC node 111 carries a positive potential, wherein the second DC node 113 carries a negative potential relative to the potential of the first DC node 111.

The generator side converter portion 109 comprises IGBTs 117 and 119 for each phase 103, 105, 107 of the electric power stream. In particular, the IGBTs 117, 119 are connected in series between the first DC node 111 and the second DC node 113. In parallel to each of the IGBTs 117, 119 a diode 121, 123, respectively, is connected. The output terminal phase 103 delivers the current is to a point between the IGBT 117 and the IGBT 119, wherein the other output terminal phases 105, 107 deliver a current ib and ic, respectively, to a mid point of the respective IGBTs 117, 119.

Thereby, under normal operating conditions, in which the wind turbine generates electric power a particular DC voltage is generated across the first DC node 111 and the second DC node 113.

The DC-link 115 comprises a capacitor 125 connected between the first DC node 111 and the second DC node 113. The capacitor 125 stores charge and smoothes AC components of the DC voltage out.

The DC-link 115 further comprises a first chopper 127 and a second chopper 129 connected in parallel to each other between the DC nodes 111, 113. The first chopper 127 comprises, as the second chopper 129, an IGBT 131 and a resistor 133 which are connected in series between the first DC node 111 and the second DC node 113. Further, in parallel to the IGBT 131 a diode 135 is connected and in parallel to the resistor 133 a diode 135 is connected.

The chopper 127 and the chopper 129, in particular the IGBT 131 of these choppers, are controlled regarding their conductance states by the arrangement 160 for operating a converter according to an embodiment. In particular, the arrangement 160 comprises an output terminal 137 outputting a control signal 139 which is supplied to a gate of the IGBTs 131 of the choppers 127 and/or 129. Thereby, the conductance state of the IGBTs 131 of the choppers 127, 129 may be switched on or off to enable and disable, respectively, the choppers 127, 129 during particular overvoltage conditions, as will be explained below with reference to FIG. 2.

The converter 100 further comprises a grid side converter portion 141 which converts the DC voltage across the first DC node 111 and the second DC node 113 to a fixed frequency output stream delivered in three phases to three output terminals 143, 145, 147. For the conversion the grid side converter portion 141 comprises three pairs of IGBTs 149, 151, wherein the IGBTs 149, 151 of each pair for each phase are connected in series between the first DC node 111 and the second DC node 113. The three different phases 143, 145, 147 of the output terminal are connected between the respective IGBTs 149 and 151. Further, parallel to each IGBT a diode 150 is connected.

At each output phase 143, 145, 147 or at each terminal 143, 145, 147 corresponding to the three phases a reactor 153 is connected for attenuating high frequency components. Further, a pulse width modulation filter 155 is connected to the three terminals via the inductors 153 in order to further attenuate high frequency components. Via switches or contactors (for disconnecting the wind turbine from the grid) 156 the wind turbine is connected to a wind turbine transformer 157 which transforms the AC voltage to a medium voltage power stream which is delivered to a utility grid 158 via a not illustrated point of common coupling and a not illustrated transmission line.

For generating the fixed frequency AC power stream at the output terminals 143, 145, 147 the grid side converter portion 141, in particular its IGBTs 149, 151, are controlled regarding their conductance state by an output signal or output signals comprising pulse width modulation signals 154 which is output by the arrangement 160 at the output terminal 152. For generating the output signals 139 for the IGBTs 131 of the choppers 127, 129 and for generating the output signal 154 for the IGBTs 149, 151 of the grid side converter portion 141 the arrangement 160 receives at an input terminal 148 a signal 146 indicative of a voltage of the utility grid 158.

Figure 2:
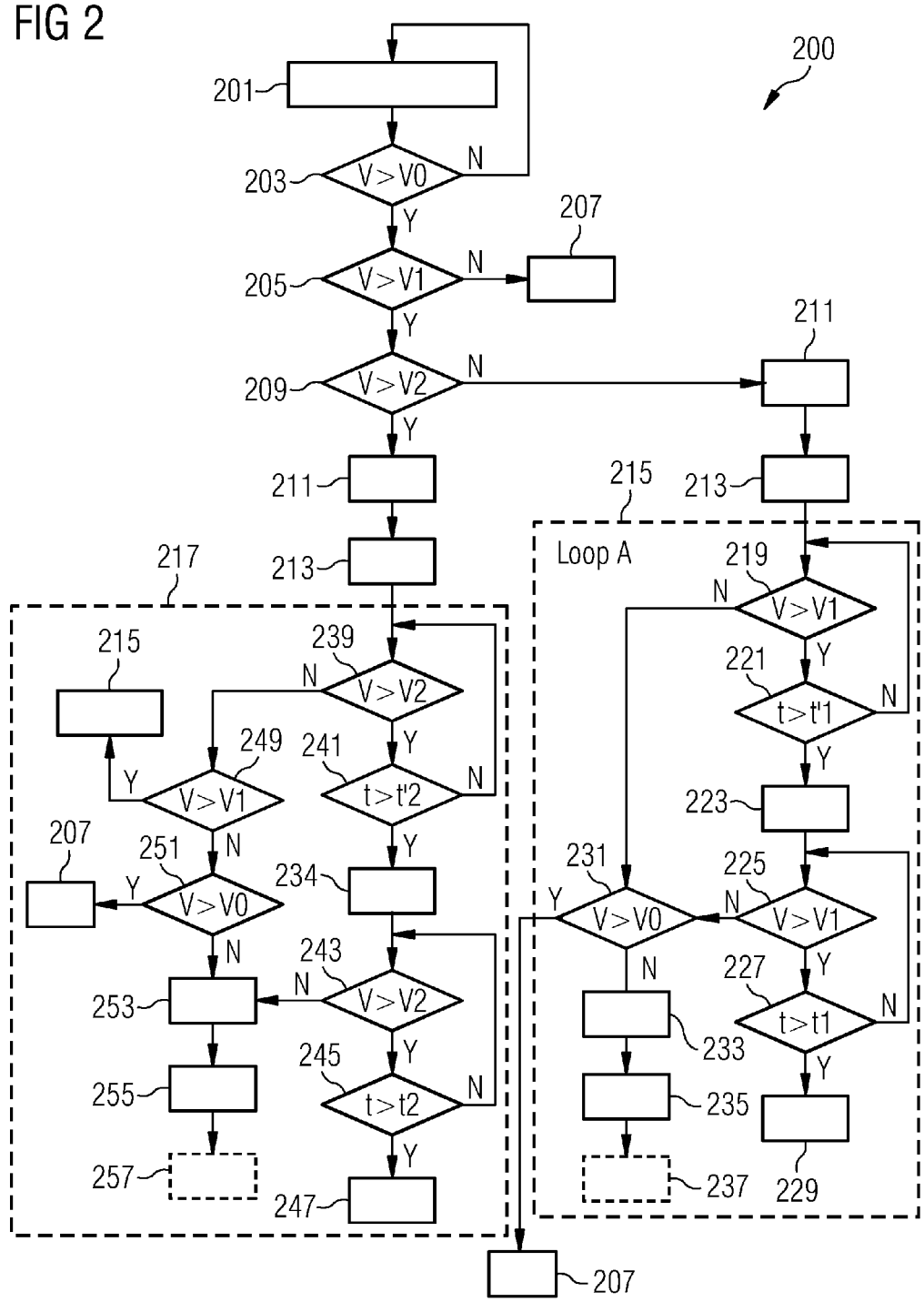
FIG. 2 schematically illustrate a method for operating or controlling a converter, such as the converter illustrated in FIG. 1, according to an embodiment, which may be implemented in an arrangement for operating a converter according to an embodiment.

The method performed by the arrangement 160 is schematically illustrated in FIG. 2 as method 200. According to an embodiment, during an overvoltage at the utility grid 158, the pulse width modulation signal 154 is prohibited and the diodes 150 are used to charge the DC-link capacitor 125 during the transient overvoltage at the utility grid 158. At the same time, the choppers 127, 129 or at least one of them is used to dissipate energy from both the generator 101 and the utility grid 158 during the transient overvoltage of the utility grid 158.

The wind turbine (from which only the shaft 102 including blades and the generator 101 is illustrated in FIG. 1) is only tripped, if the overvoltage lasts too long. However, before tripping the wind turbine pitching out the rotor blades is carried out to reduce energy storage in the blade rotor and generator. By doing so, the risk of frequency converter and auxiliary equipment damage is mitigated during turbine trip and islanding. If the measured voltage V deviates less than for example 15% from a nominal voltage V0, the method 200 in FIG. 2 performs a normal operation 201. If a decision block 203 determines that the grid voltage V is larger than the nominal voltage V0 (indicated by the label "Y") then a next decision block 205 is reached in which it is checked whether the grid voltage V is larger than a first voltage threshold V1. If this is not the case (indicated by label "N"), then a normal high voltage right through procedure 207 is carried out.

In the other case (labelled with label "Y") a further decision block 209 is reached, in which it is checked, whether the measured voltage V is larger than a second voltage threshold V2.

Thereafter, in any case, a step of enabling a chopper 211 and a subsequent step of prohibiting PWM signals 213 is performed. Thereby, during the step 211 of enabling the chopper the conductance states of the IGBTs 131, of the choppers 127, 129 are turned on by appropriately generating the control signal 139 by the arrangement 160 illustrated in FIG. 1. Further, during the step 213 of prohibiting the PWM signal the conductance states of the IBGTs 149, 151 of the grid side converter portion 141 of the converter 100 are turned off by appropriately generating the control signal 154 by the arrangement 160 illustrating in FIG. 1.

In the case where the measured voltage V is not larger than the second voltage threshold V2 a first procedure 215 (also referred to as loop A) is performed while in the case in which the measured voltage V is larger than the second voltage threshold V2 a second procedure 217 (also referred to as loop B) is performed.

In the first procedure 215 it is checked, whether the measured voltage V is still larger than the first voltage threshold V1 in the decision block 219. If this is the case it is checked whether this condition lasts longer than a first time interval t'1, while this determination is made in the block 221. If this is the case pitching out of the rotor blades is performed in the step 223. After pitching out the rotor blades in step 223 it is determined in a decision block 225 whether the measured voltage V is still larger than the first voltage threshold V1. If this is the case, it is determined in a block 227 whether this lasts longer than another first time interval t1. If this is still the case the turbine is tripped in a step 229 thus disconnecting the wind turbine from the utility grid 158.

If in the step 221 it is determined that the condition that V>V1 applies not longer than the first time interval t'1, it is looped back to the decision block 219. If in the decision block 227 it is determined that the condition V>V1 does not last longer than the other first time interval t1, it is looped back to the decision block 225.

If in the decision block 219 it is determined that the grid voltage V is not greater than the first voltage threshold V1, it is branched to the decision block 231 in which it is checked, whether the measured voltage V is larger than the nominal voltage V0. If this is the case, it is branched to the normal high voltage ride-through procedure 207.

If on the other hand the measured voltage V is not larger than the nominal voltage V0, in a step 233 the PWM signals are enabled, in order to resume normal operation. Thereby, the normal pulse width modulation signals 154 are generated by the arrangement 160 and supplied to the IGBTs 149, 151 of the grid side converter portion 141 of the converter 100.

After that the step 235 is carried out, in which the choppers 127, 129 are disabled by setting the conductance states of the IGBTs 131 to a non-conducting state by appropriately generating the signal 139 by the arrangement 160. Thereby, normal operation 237 is achieved.

In the second procedure 217 it is checked in the decision element 239, whether the measured V is larger than the second voltage threshold V2. If this is the case, it is carried out a check in the element 241, whether this last longer than a second time interval t'2. If this is the case, pitching out blades is carried out in the step 234. After that it is determined in a decision block 243, whether still the measured voltage V is larger than the second voltage threshold V2. If this is the case, it is checked in a block 245, whether this lasts longer than another second time interval t2. If this is still the case the turbine will be tripped in the step 247 which may be similar to the step 229 in the first procedure 215.

If in the decision element 239 it is determined that the measured voltage V is not larger than the second voltage threshold V2, it is branched into a decision block 249 in which it is determined whether V>V1. If this is the case, it is branched to the first procedure 215.

If this is not the case, it is branched to a decision element 251 in which it is checked, whether V>V0. If this is the case, it is branched into the normal high voltage ride-through procedure 207.

However, if V>V0 is not satisfied, then in a step 253 the PWM signal are enabled, being similar to step 233 in the first procedure 215. After that the chopper control is disabled in the step 255 which may be similar or equal to the step 235 in the first procedure 215. Finally, normal operation is reached in step 257 which may correspond or equal to the method step 237 in the first procedure 215.

Figure 3:
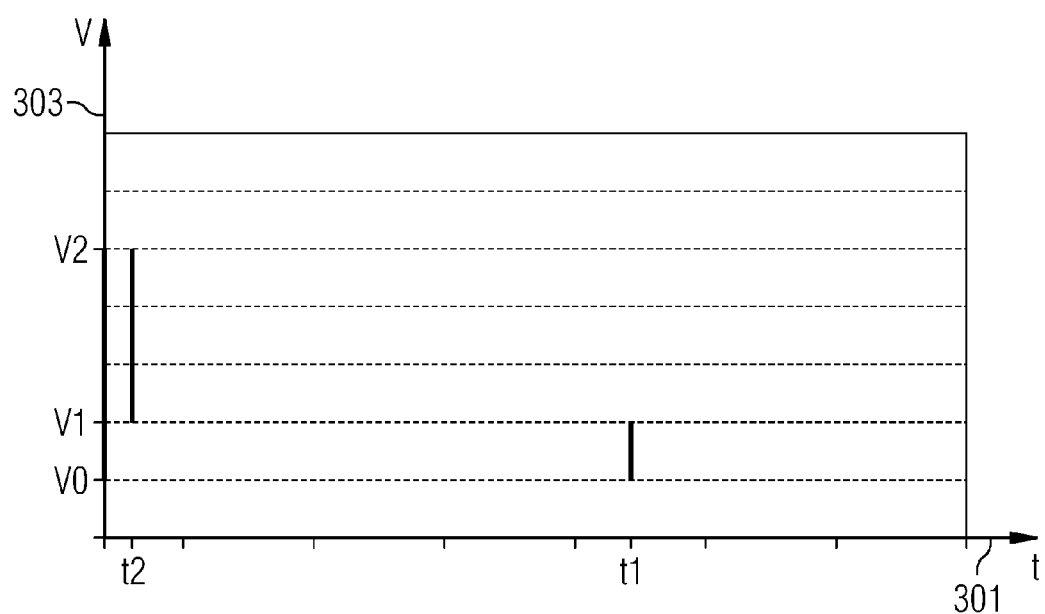
FIG. 3 illustrates a graph depicting some parameters and voltage thresholds considered in the method illustrated in FIG. 2.

FIG. 3 illustrates (abscissa 301 indicating time t, ordinate 303 indicating voltage V) several voltage thresholds V0, V1, V2 and their corresponding allowed duration t1, t2 according to an embodiment. Firstly, the allowed duration of overvoltage of each voltage threshold is defined. If high voltage is higher than a certain threshold and lasts longer than the defined time duration, turbine may be tripped in order to avoid equipment damage. The allowed duration of overvoltage may depend on the size of the DC chopper 127, 129 and the duration(s) that may also depend on the diode bridge 135. The corresponding time duration $t_{th}$ (such as t1, t2, t'1, t'2) may be calculated to be around x % (e.g. 20%) of safety margin based on the size of the DC chopper 127, 129 and the diode specifications of the diodes 135 as follows:

$$\begin{cases} t_2 s & V \leq V_2 \\ t_1 s & V_1 \leq V < V_2 \\ \text{Normal } HVRT & V_0 \leq V < V_1 \\ \text{Normal operation} & V < V_0 \end{cases} \quad (1)$$

Further, in order to avoid overvoltage in turbine generator during the turbine trip the rotor blades may be pitched out to reduce energy stored in the generator 101. Therefore, pitching out is activated at a time $t'_{th}$ before $t_{th}$. The time duration $\Delta t$ between $t_{th}$ and $t'_{th}$ may be chosen such that the rotor blade can be pitched out to a rather safe position during this duration:

$$\begin{cases} t'_2 s & V \leq V_2 \\ t'_1 s & V_1 \leq V < V_2 \\ \text{Normal } HVRT & V_0 \leq V < V_1 \\ \text{Normal operation} & V < V_0 \end{cases} \quad (2)$$

In the normal operation (such as normal operation 237 or 257 in FIG. 2) the DC-link voltage VDC reverse biases the diodes 135 of the DC choppers 127, 129. When a high voltage is detected (high grid voltage V) and V is lower than V1, a normal high voltage ride-through mode (method steps 207) is carried out or activated.

Thereby, the converter 100 will be controlled to inject a certain amount of reactive current in a way to bring down the grid voltage V corresponding to the voltage at the terminals 143, 145, 147. When the measured voltage V is greater than V1, PWM signals of the grid converter 100 are prohibited and the DC chopper controller will be enabled to regulate the DC-link voltage VDC to its reference value. The high measured voltage V will forward bias the diodes 135 of the grid side portion 141 of the converter 100 and charge the DC-link capacitor 125.

The phase-to-phase grid voltage V may be filtered and a root-mean square value (RMS) may be calculated and compared with the corresponding voltage threshold $V_{th}$ (i.e. V0, V1 or V2, respectively). If the RMS voltage is higher than $V_{th}$ for longer than $t'_{th}$, when pitching out the rotor blades may be activated. If the measured voltage V does not return to a normal value until $t_{th}$, the turbine may be tripped.

After the transient overvoltage period PWM signals of the grid converter may be re-enabled and the chopper controller may be disabled.

The embodiments provide the following advantages:

1. To carry out the method new additional hardware may be necessary. The DC chopper 127, 129 may, in a conventional system, be used for a low voltage ride-through in order to absorb energy from the generator 101 during a fault.

2. By prohibiting IGBT switching actions the over voltage is limited only from the grid. The over voltage due to grid together with high voltage induced by switching action and switching transient of IGBT modules results in extreme high voltage. PWM switching which could be as high as 1900 V and therefore could destroy the IGBT. Overvoltage due to the switching transient can be avoided by prohibiting IGBT switching actions during over voltage transient.

3. The wind turbine may be ride-through in a safe manner through transient overvoltage.

4. The wind turbine may cover to resume normal operation or normal energy production immediately after the transient overvoltage, if the overvoltage lasts shorter than a predefined duration.

5. The reliability of the wind turbine is increased and protection of components of the wind turbine is improved.

According to an embodiment, the following voltage thresholds and time thresholds may apply:

$$\begin{cases} 0.02 \text{ s } 140\% \leq V \\ 0.2 \text{ s } 130\% \leq V < 140\% \\ 1 \text{ s } 120\% \leq V < 130\% \\ \text{continuously operation } V \leq 115\% \end{cases}$$

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. Method of operating a converter of a wind turbine for providing electric energy to a utility grid, the method comprising:
    determining a grid voltage;
    performing a first procedure including lowering the grid voltage if the grid voltage is between a nominal voltage and a first voltage threshold, the first voltage threshold being greater than the nominal voltage;
    performing a second procedure if the grid voltage is above the first voltage threshold, wherein the second procedure includes keeping a DC voltage of a converter in a specific range,
    wherein the first and second procedure are different,
    wherein the second procedure comprises, after enabling a chopper, disabling a pulse width modulation, wherein disabling the pulse width modulation comprises:
    switching a second controllable switch of a grid side converter portion to a non-conducting state,
    dissipating electric energy by current flow through a diode,
    wherein the second controllable switch and the diode are connected in parallel between two DC-nodes of a DC-link of the converter,
    wherein the second controllable switch is provided with pulse width modulation signals for controlling a conductance state of the second controllable switch to change with a higher frequency than the grid frequency, if the grid voltage deviates from the nominal voltage by less than a predefined percentage.

2. The method according to claim 1, wherein enabling the chopper comprises switching a first controllable switch to a conducting state for dissipating electric energy, wherein the first controllable switch is connected between the two DC nodes.

3. The method according to claim 2, wherein between the two DC nodes a resistor and the first controllable switch are connected in series.

4. The method according to claim 1, wherein the grid voltage deviates from the nominal voltage by less than 15%.

5. The method according to claim 1, wherein the second procedure further comprises:
    performing a third procedure if the grid voltage is above the first voltage threshold and below a second voltage threshold; and
    performing a fourth procedure if the grid voltage is above the second voltage threshold.

6. The method according to claim 1, wherein the first procedure comprises injecting reactive power from the wind turbine to the utility grid.

7. Method of operating a converter of a wind turbine for providing electric energy to a utility grid, the method comprising:
    determining a grid voltage;
    performing a first procedure including lowering the grid voltage if the grid voltage is between a nominal voltage and a first voltage threshold, the first voltage threshold being greater than the nominal voltage;
    performing a second procedure if the grid voltage is above the first voltage threshold, wherein the second procedure includes keeping a DC voltage of a converter in a specific range, wherein the first and second procedure are different;
    performing a third procedure if the grid voltage is above the first voltage threshold and below a second voltage threshold; and
    performing a fourth procedure if the grid voltage is above the second voltage threshold, wherein the third procedure comprises, if the grid voltage is above the first voltage threshold and below the second voltage threshold, for at least a first time interval, pitching out rotor blades, wherein pitching out rotor blades comprises adjusting a pitch angle of at least one rotor blade of the wind turbine to capture less energy from wind resource.

8. The method according to claim 7, wherein the third procedure comprises, after pitching out rotor blades, if the grid voltage is above the first voltage threshold for at least another first time interval, tripping the wind turbine, wherein tripping the wind turbine comprises disconnecting the wind turbine, in particular the converter, from the utility grid.

9. The method according to claim 7, wherein the third procedure comprises, if the grid voltage deviates less than a predefined percentage from the nominal voltage, enabling pulse width modulation, wherein enabling pulse width modulation comprises:
    providing a second controllable switch with pulse width modulation signals for controlling the conductance state of the second controllable switch such as to achieve the nominal voltage at an output terminal of the converter.

10. The method according to claim 9, wherein the third procedure comprises, after enabling pulse width modulation, disabling a chopper, wherein a first controllable switch is connected between two DC nodes of a DC-link of the converter, wherein disabling the chopper comprises switching the first controllable switch to a non-conducting state for disconnecting the two DC-nodes from each other.

11. The method according to claim 7, wherein the fourth procedure comprises, if the grid voltage is above the second voltage threshold for at least a second time interval, pitching out rotor blades.

12. The method according to claim 11, wherein the fourth procedure comprises, if the grid voltage is above the second voltage threshold for at least another second time interval, tripping the turbine, wherein the other second time interval is greater than the second time interval by delta.

13. The method according to claim 7, wherein the fourth procedure comprises, if the grid voltage is above the first voltage threshold and below the second voltage threshold, performing the third procedure.

14. The method according to claim 7, wherein the third procedure and/or the fourth procedure comprises, if the grid voltage is above the nominal voltage and below the first voltage threshold, performing the first procedure.

* * * * *